Nov. 30, 1965 N. J. STOWELL 3,221,329
METHOD AND SYSTEM FOR CENTRAL STATION GENERATION AND TRANSMISSION OF RADIO CARRIER WAVES FOR USE BY REMOTE MODULATING AND TRANSMITTING STATIONS
Filed Oct. 10, 1962 3 Sheets-Sheet 1
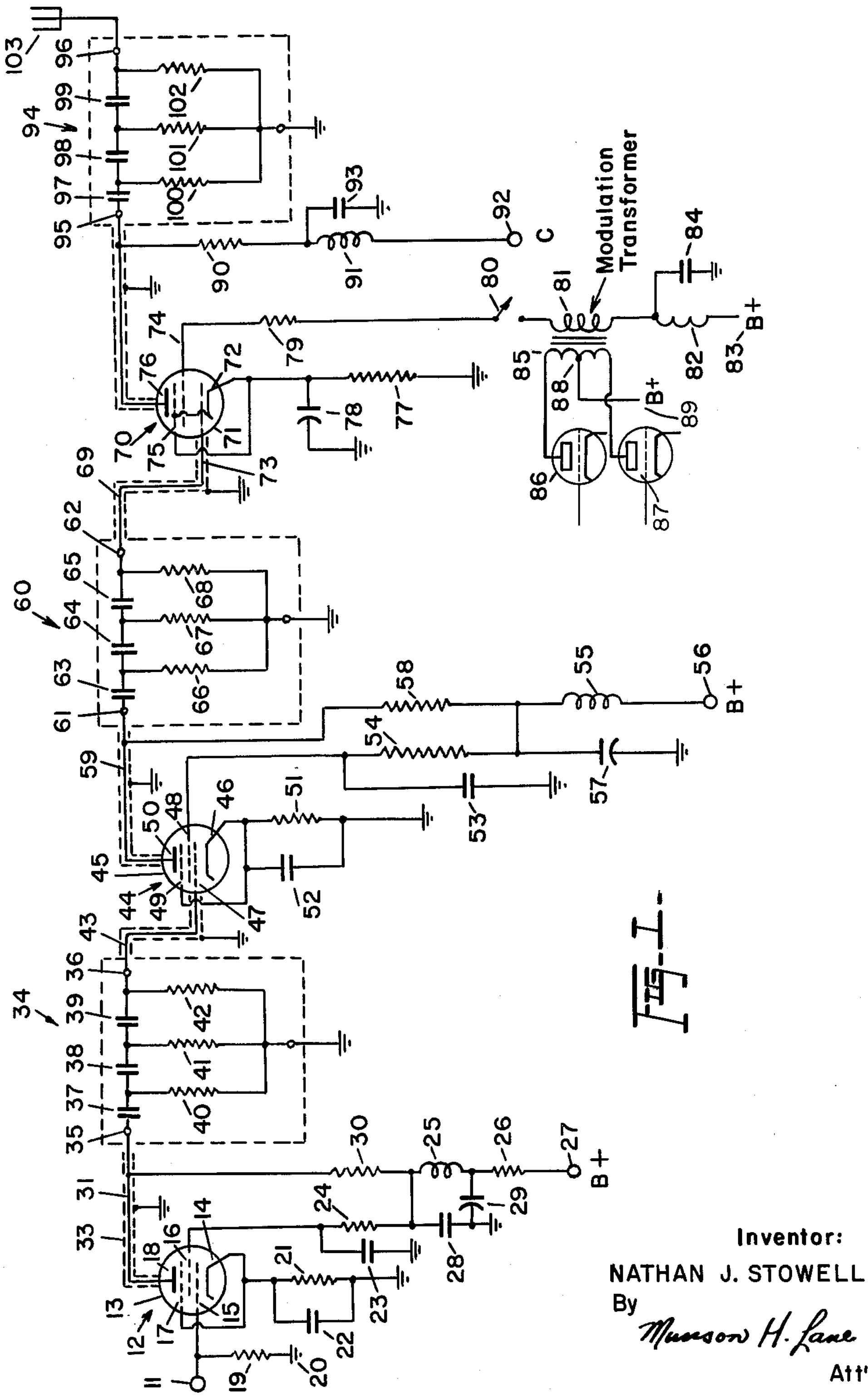
FIG. I
Inventor:
NATHAN J. STOWELL
By Munson H. Lane
Att'y.

Nov. 30, 1965 N. J. STOWELL 3,221,329

METHOD AND SYSTEM FOR CENTRAL STATION GENERATION AND TRANSMISSION OF RADIO CARRIER WAVES FOR USE BY REMOTE MODULATING AND TRANSMITTING STATIONS

Filed Oct. 10, 1962 3 Sheets-Sheet 2

Inventor:
NATHAN J. STOWELL
By Munson H. Lane
Att'y.

Nov. 30, 1965 N. J. STOWELL 3,221,329

METHOD AND SYSTEM FOR CENTRAL STATION GENERATION AND TRANSMISSION OF RADIO CARRIER WAVES FOR USE BY REMOTE MODULATING AND TRANSMITTING STATIONS

Filed Oct. 10, 1962 3 Sheets-Sheet 3

Inventor:
NATHAN J. STOWELL
By Munson H. Lane
Att'y.

United States Patent Office 3,221,329
Patented Nov. 30, 1965

3,221,329
METHOD AND SYSTEM FOR CENTRAL STATION GENERATION AND TRANSMISSION OF RADIO CARRIER WAVES FOR USE BY REMOTE MODULATING AND TRANSMITTING STATIONS

Nathan J. Stowell, Jackson, Miss., assignor to James Willis Hughes, Jackson, Miss.

Filed Oct. 10, 1962, Ser. No. 229,636
5 Claims. (Cl. 343—208)

This invention relates to an improved broad band transmitter.

It is an object of this invention to provide a broad band transmitter which is capable of transmitting a broad band of radio frequency signals.

It is another object of this invention to provide a broad band transmitter which is capable of transmitting simultaneously a band of radio frequency carrier signals covering the range of radio frequencies permitted by the Federal Communications Commission within a designated area. The radio frequency signals transmitted simultaneously may be conducted by coaxial cable or other media to remote stations where a selected RF carrier frequency is separated by means of a narrow band pass filter network and modulated for subsequent transmission over the air waves or other media.

It is another object of this invention to provide a transmitter which is capable of transmitting over a broad band signals which are substantially free of harmonic and phase distortion.

It is another object of this invention to provide a transmitter having a coupling network which eliminates tuning and neutralizing coils between stages.

It is another object of this inveniton to provide a broad band coupling network which is susceptible of modular construction and which may be plugged into the transmitter circuits for which use is adapted.

It is another object of this invention to provide a coupling network which facilitates production standardization.

It is another object of this invention to provide a transmitter that does not require frequent tuning or servicing to keep the transmitter at a proper amplitude level at a predetermined frequency.

Other objects of this invention will be more apparent from the following detailed description read in conjunction with the accompanying drawings:

In the drawings:

FIG. 1 is a schematic diagram showing one form of the broad band transmitter constructed in accordance with this invention;

Figure 3:
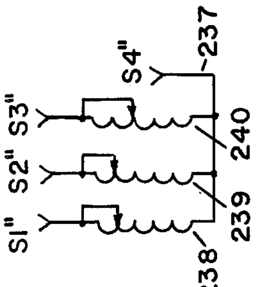
FIG. 3 is a schematic diagram showing a modified loading section for the output coupling network shown in FIG. 2.

A disadvantage of broad band transmitters known heretofore has been harmonic and phase distortion. The Federal Communications Commission requires approximately 75 decibel attenuation of total harmonics and phase distortion with reference to the fundamental carrier frequency. It has not been possible by using broad band amplifiers for broadcast work to obtain the required db attenuation over the broadcast band.

Another disadvantage of broad band amplifiers known heretofore for broadcast work has been the high attenuation loss in the coupling networks between stages. The commonly used tuned plate-tuned grid coupling, for example, is subject to the following disadvantages:

(1) The amplifier is very definitely limited to extremely narrow band widths.

(2) The possibilities of spurious frequencies are very hard to control.

(3) Power loss occurring because of constant changing dielectric characteristics varying with conditions of the atmosphere which affect capacitors and inductors is high.

(4) Interstage radiation and consequent varying power losses and proximity effects is excessive.

An advantage of the broad band transmitter of this invention is that harmonic and phase distortions are minimized to a range within the standards of good engineering practice. Harmonic and phase distortion measured at the output of the broad band transmitter of this invention are almost immearsurable with recognized test instruments of good quality.

Another advantage of this invention is that coupling losses between stages of the transmitter are minimized to within an acceptable range.

Another advantage of this invention is the simplicity of construction of the broad band transmitter. The particular coupling network used in this invention eliminates the need for frequent tuning of the coupling networks.

In FIG. 1 one form of the broad band transmitter of this invention is disclosed wherein reference numeral 11 designates an RF input jack from an RF oscillator (not shown). The oscillator may be a crystal controlled oscillator or a variable frequency oscillator capable of producing signals covering a wide range of the RF spectrum. It is within the scope of this invention that plural RF generators, each operating at separated frequencies within the RF frequency spectrum, can be connected to the input jack 11 and the signals therefrom transmitted simultaneously.

The input jack 11 is connected directly to the control electrode 15 of a first stage amplifier 12.

The first stage amplifier 12, as illustrated in FIG. 1, includes a pentode vacuum tube 13 having a rathode 14, a control grid 15, a screen grid 16, a suppressor grid 17, and a plate 18, and is connected for Class A amplification. for purpose of illustration only the vacuum tube of the first stage amplifier may be a tube type 6AU6.

A grid limiting and bias resistor 19 is connected between control grid 15 and ground 20.

Cathode bias resistor 21 and cathode by-pass capacitor 22 are connected in parallel between the cathode 14 and ground. Suppressor grid 17 is connected to the cathode 14.

Capacitor 23 is an RF by-pass capacitor for the screen grid 16 which connects the screen grid 16 to ground.

Screen grid voltage dropping resistor 24 in series circuit with plate filter choke coil 25 and voltage dropping resistor 26 connects the screen grid 16 to B+ potential source 27.

Capacitor 28, connecting the junction of resistor 24 and choke filter 25 to ground, is an RF filter capacitor for the supply voltage to the screen grid voltage dropping resistor 24.

Capacitor 29 connecting the junction of choke filter 25 and load resistor 26 to ground is a supply voltage filter capacitor for the plate supply voltage and screen supply voltage of vacuum tube 13. Plate load resistor 30 is connected in series circuit with choke coil 25 and resistor 26 between plate 18 and B+ voltage supply 27.

The output from the plate 18 of amplifier 12 is fed by means of a shielded conductor 31 to the input terminal 35 of a three-section RC coupling network 34. The shield 33, indicated by dotted lines for conductor 31, is grounded. The output terminal 36 of coupling network 34 is connected by a shielded conductor to the control grid 47 of a second stage amplifier 44.

The coupling network 34 is similar to the coupling network described in my application Serial No. 122,532, filed July 7, 1961, now abandoned, entitled Amplifier System. It includes equal value capacitors 37, 38 and 39 connected in series between the input terminal 35 and output terminal 36 of the coupling network, and equal value resistors 40, 41 and 42 connected respectively between ground and the junction of capacitors 37 and 38, between ground and the junction of capacitors 38 and 39, and between ground and the output terminal 36.

Resistor 42 is selected of resistance value as designated by the manufacturer of the vacuum tube 45, included in the second stage amplifier 44, for the grid resistor. Resistors 40 and 41 are chosen of resistance value substantially equal to resistor 42.

Capacitors 37, 38 and 39 are selected of such value that when acting in cooperation with resistors 40, 41 and 42 the coupling network 34 produces a phase shift of substantially 180 degrees lead for the lowest frequency for which the transmitter is designed. The coupling network 34 will pass a wide band of frequencies with minimum phase and harmonic distortion.

The second stage amplifier 44 is a Class A amplifier which includes a pentode vacuum tube 45 having a cathode 46, a control grid 47, screen grid 48, suppressor grid 49 and plate 50. The vacuum tube 45 may be a 6AK6 type tube, but this invention is not limited by the particular tube types used for the amplifiers.

Cathode bias is provided for amplifier 44 by means of cathode bias resistor 51 and cathode by-pass capacitor 52 connected in parallel between the cathode 46 and ground. Suppressor grid 49 is connected to the cathode 46. Screen grid 48 is connected to B+ voltage 56 through screen grid voltage dropping resistor 54 and plate choke coil 55. Capacitor 53 is a screen grid supply by-pass capacitor connecting the screen grid to ground. Capacitor 57 connecting the junction of resistor 54 and choke coil 55 to ground is an RF filter capacitor for the supply voltage. Plate load resistor 58 is connected in series circuit with choke coil 55 between the plate 50 and B+ voltage supply 56.

The output from the plate 50 of second stage amplifier 44 is fed by means of a shielded conductor 59 to the input terminal 61 of coupling network 60. The output terminal 62 of the coupling network 60 is connected by a shielded conductor 69 to the control grid 73 of final amplifier 70.

The coupling network 60 is similar to coupling network 34. It includes equal value capacitors 63, 64 and 65 connected in series between the input terminal 61 and output terminal 62 of the coupling network, and resistors 66, 67 and 68 connected respectievly between ground and the junction of capacitors 63 and 64, between ground and the junction of capacitors 64 and 65, and between ground and the output terminal 62.

Values of capacitors 63, 64 and 65 and resistors 66, 67 and 68 are chosen in the same way as corresponding capacitors and resistors in coupling network 34 and need not be further described.

The final amplifier 70 is a power amplifier connected for screen-grid modulation and includes a pentode tube 71 having a cathode 72, a control grid 73, a screen grid 74, a suppressor grid 75 and a plate 76. The cathode 72 is connected by cathode bias resistor 77 and by-pass capacitor 78 in parallel to ground. The suppressor grid 75 is connected to the cathode 72. The screen grid 74 is connected through screen voltage dropping resistor 79, switch 80, modulation transformer coil 81, and RF choke coil 82 in series to screen supply voltage source 83. A supply voltage filter capacitor 84 is connected from the junction of the modulation transformer coil 81 and choke coil 82 to ground. The modulation transformer input coil 85 has its opposite ends connected to the plates

86 and 87 of a pair of amplifiers for the modulation signal. A center tap 88 on the modulation transformer input coil 85 is connected to a B+ voltage supply 89 for the amplifiers 86 and 87.

Plate load resistor 90 and RF choke coil 91 in series connect the plate 76 to plate voltage source 92. Capacitor 93 is an RF by-pass capacitor connected from the junction of plate load resistor 90 and choke coil 91 to ground.

The output from the final amplifier 70 is coupled by means of a coupling network 94 to an antenna 103.

The coupling network 94 is like the coupling networks 34 and 60. It includes equal value capacitors 97, 98 and 99 connected in series between input terminal 95 and output terminal 96, and equal value resistors 100, 101 and 102 connected respectively between ground and the junction of capacitors 97 and 98, between ground and the junction of capacitors 98 and 99 and between ground and the output terminal 96.

The coupling network 94 is designed of such impedance value as to match the impedance of the antenna 103 at the lowest frequency for which the transmitter is designed.

The following table is illustrative of values for the various circuit elements in the transmitter shown in FIG. 1, which is designed to operate over the band width from 50 kilocycles to 108 megacycles:

*Resistors*

| Reference numeral: | Resistance value |
|---|---|
| 77 | ohms 200 |
| 21 | ohms 220 |
| 51 | 2K |
| 90 | 8K |
| 30 | 10K |
| 58 | 39K |
| 26 | 60K |
| 40, 41, 42, 66, 67, 68 | 68K |
| 79, 100, 101, 102 | 68K |
| 24 | 81K |
| 19, 54 | 100K |

*Capacitors*

| Reference numeral: | Capacitance value |
|---|---|
| 23, 53 | mmf 150 |
| 37, 38, 39, 63, 64, 65 | mmf 620 |
| 97, 98, 99 | mmf 3000 |
| 22, 28, 52 | mf .01 |
| 93 | mf .5 |
| 57 | mf 20 |
| 29 | mf 80 |
| 78 | mf 100 |

*Inductors*

| Reference numeral: | Inductance value |
|---|---|
| 25 | 1000 microhenrys |
| 55 | 1500 microhenrys |
| 91 | 1500 microhenrys |

*B+ power supply voltage*

| Reference numeral: | Voltage, volts |
|---|---|
| 27, 56, 83 | +200 |
| 92 | +400 |

The values given in the above table are given by way of illustration only and are not to be construed as a limitation of the scope of this invention.

Various types of modulation can be used within the scope of this invention and it is not intended that the particular type modulation illustrated in FIG. 1 be construed as a limitation as to the scope of this invention.

Figure 2:
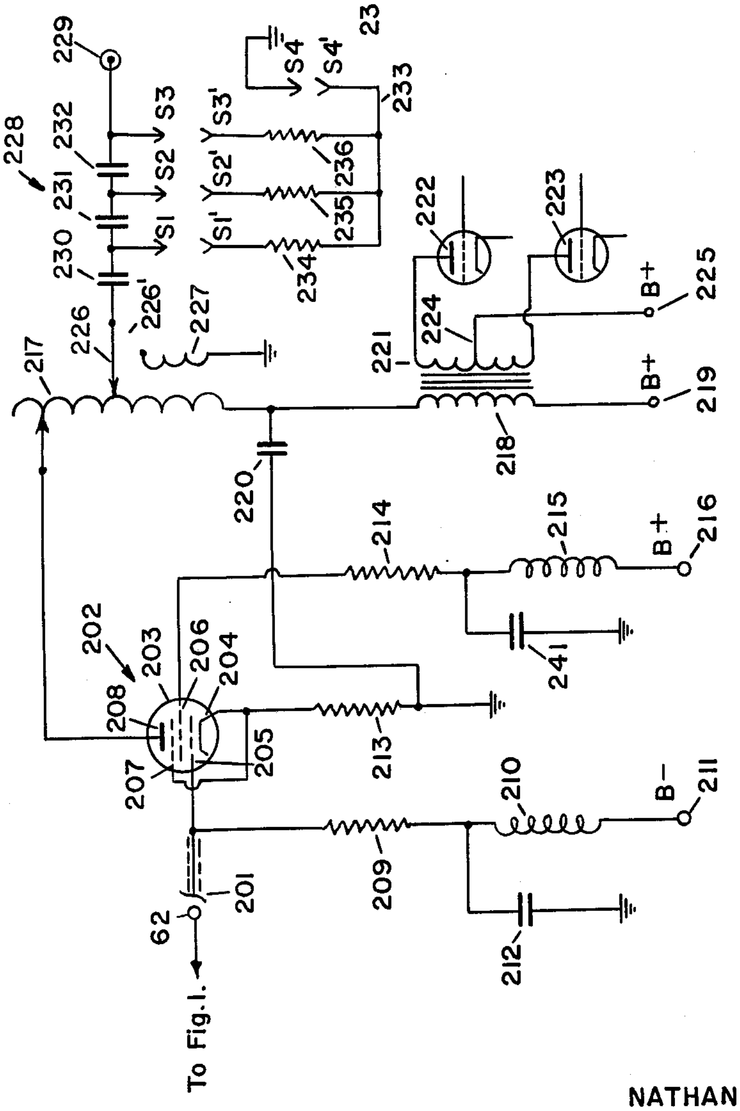
FIG. 2 is a schematic diagram showing a final amplifier and modulator section which may be substituted for the final amplifier section shown in FIG. 1.

FIG. 2 is illustrative of another final amplifier stage and antenna coupling network that may be used as a modification for the transmitter shown in FIG. 1.

The final stage amplifier 202 may be used to replace the amplifier 70 shown in FIG. 1 by connecting it to the output terminal 62 of the coupling network 60 by means of shielded conductor 201.

The amplifier 202 includes a pentode vacuum tube 203 connected Class $AB_2$. The vacuum tube 203 includes cathode 204, control grid 205, screen grid 206, suppressor grid 207, and plate 208. The cathode 204 is connected by cathode bias resistor 213 to ground. The grid 205 is connected by grid bias resistor 209 and RF choke coil 210 to the negative bias voltage supply 211. Capacitor 212 is an RF by-pass capacitor connected from the junction of the resistor 209 and choke coil 210 to ground. The screen grid 206 is connected through voltage dropping resistor 214 and RF choke coil 215 to the B+ power supply 216. The plate 208 is connected by a variable tap to tank coil 217. The tank coil 217 is connected in series circuit with modulation transformer coil 218 to B+ power supply 219. A decoupling capacitor 220 is connected from the junction of tank coil 217 and modulation transformer 218 to ground. The modulation transformer input coil 221 has its opposite ends connected to the plates 222 and 223 of a pair of amplifiers for the modulation signal. A center tap 224 on the modulation transformer input coil 221 is connected to a B+ voltage supply 225 for the amplifier plates 222 and 223. Capacitor 241 is a screen grid by-pass capacitor connected from a junction between resistor 214 and RF choke coil 215 to ground.

Modulated radio frequency output may be taken directly from the tank coil 217 by means of tap 226, or through transformer coil 227 by means of tap 226′.

A coupling network 228 couples the output from the final amplifier 202 to an antenna jack 229. The coupling network 228 includes capacitors 230, 231 and 232 connected in series circuit between tap 226 and output jack 229. Three separable connection terminals S1, S2, S3 are connected respectively at the junction of capacitors 230 and 231, at the junction of capacitors 231 and 232, and at the junction of capacitors 232 and the output terminal 229. A fourth separable connection terminal S4 is connected to ground.

The coupling network 228 may be completed by plugging in one of several separable sections depending on whether broad band or narrow band loading is desired. Separable section 233 is designed for broad band loading and includes resistors 234, 235 and 236 each having one of their ends connected to a common terminals S4′ and their opposite ends connected to separate terminals S1′, S2′ and S3′, respectively.

In FIG. 3 a narrow band loading section 237, which may be used to complete the coupling network 228, is shown. The loading section 237 includes adjustable inductors 238, 239 and 240 each having one of their ends connected to a common terminal S4″ and their opposite ends connected to separate terminals S1″, S2″, S3″, respectively.

The separable section 233 shown in FIG. 2 and separable section 237 shown in FIG. 3 may be interchanged as desired, depending on the desired use of the transmitter 10 for broad band or narrow band transmission. If the transmitter is to be used for broad band transmission in accordance with this invention the loading section 233 is connected to the coupling network 228 and tap 226 is connected directly to the coil 217.

If it is desired to use the transmitter 10 for narrow band transmission the loading section 237 is connected to the coupling network 228 and the tap 226′ is connected to the coupling coil 227.

It has been previously stated that it is an object of this invention to provide a broad band transmitter which is capable of transmitting multiple RF carrier signals from one station to remote stations where a particular RF carrier signal can be modulated and further transmitted over the air waves or other media. The broad band transmitter shown in FIG. 1 is particularly adaptable to do this because of the phase compensating and broad band coupling networks 34, 60 and 94 used between stages. By opening the switch 80 in the final amplifier stage 70 (see FIG. 1) RF carrier signals can be transmitted without modulation.

Figure 4:
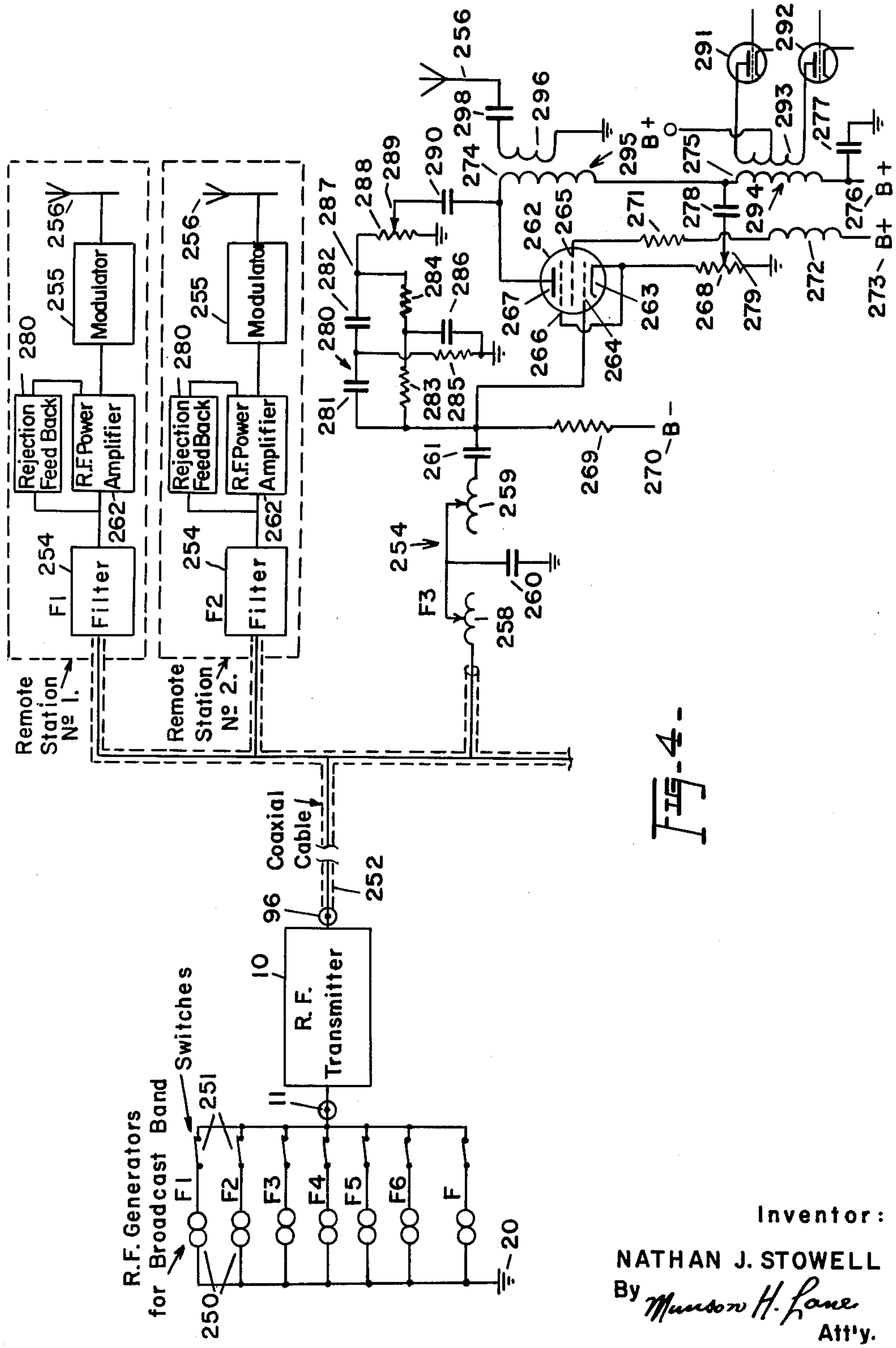
FIG. 4 is a diagrammatic representation of the broad band transmitter of this invention used in a transmission system for transmitting plural RF carrier signals over coaxial cable to remote stations.

In FIG. 4 a plurality of RF generators 250 are shown connected in parallel circuit between ground and the input jack 11 to the transmitter 10 (shown in block form). Each of the generators 250 produces a particular channel carrier frequency within the broadcast band for which the transmitter 10 is designed. The generators 250 are each in series circuit with switch means 251 so that the RF generators can be cut in or out of circuit with the transmitter 10 as desired.

The RF generators 250 and transmitter 10 may be located at one station where they are under the maintenance of a trained group of technicians and engineers. The plural RF carrier signals generated at the one station can be transmitted over coaxial cable 252 to various remote station 253 where a particular channel carrier signal may be modulated and further transmitted over the air waves or other media. At the remote stations would be located a filter network 254, RF power amplifier 262, rejection feed back network 280, a modulator 255 and antenna 256. The rejection feed back network 280 is a parallel T null rejection filter connected degeneratively from the output of the amplifier 262 to the input of the same amplifier. The parallel T filter rejects the carrier frequency assigned to the respective remote stations and feeds back unwanted signals from the output of amplifier 262 in phase opposition to incoming unwanted signals so as to nullify the unwanted incoming signals.

Typical apparatus at a remote station is shown schematically in the lower right hand portion of FIG. 4, wherein reference numeral 254 designates a T matching network comprising adjustable coils 258 and 259 in series and capacitor 260 connecting the junction of coils 258 and 259 to ground. Coil 258 is connected to the center conductor of coaxial cable 252 and is tuned to match the impedance of the coxial transmission line. Coil 259 is connected in series with capacitor 261 to the control grid 264 of the amplifier and modulator tube 262 and is tuned to match the impedance of the amplifier tube 262.

The amplifier tube 262 is shown as a pentode vacuum tube having a cathode 263, a control rigid 264, a screen grid 265, a suppressor grid 266 and a plate 267. The cathode is connected through cathode resistor 268 to ground. The control grid is connected through grid resistor 269 to negative bias source 270. The screen grid 265 is connected through screen grid load resistor 271 and RF choke coil 272 in series to a positive voltage source 273. The suppressor grid 266 is connected to the cathode 263. The plate 267 is connected by tank coil 274 and modulation transformer coil 275 in series to a positive voltage source 276. Capacitor 277 is an RF by-pass capacitor for the plate voltage source 276 of the amplifier 262. A capacitor 278 is connected from a junction of coil 274 and coil 275 to an adjustable point on resistor 268 by means of an adjustable tap 279.

Degenerative feed back from the plate 267 to the grid 264 of the tube 262 is provided by means of the parallel T rejection feed back network 280.

The parallel T filter 280 comprises parallel branches including, respectively, capacitors 281 and 282 in series, and resistors 283 and 284 in series. Resistor 285 connects the junction of capacitors 281 and 282 and capacitor 286 connects the junction of resistors 283 and 284 to ground. A feed back control resistor 288 having a variable tap 289 connects the input terminal 287 of the parallel T filter to ground. The tap 289 is connected through decoupling capacitor 290 to the plate of vacuum tube 262.

Modulation signals may be provided from a modulation signal source (not shown) through amplifiers 291 and 292 whose plates are connected to opposite ends of the input coil 293 of the modulation transformer 294. The modulation signal is thus coupled to the plate circuit of the amplifier 262.

The modulated RF carrier signal output from the amplifier 262 is coupled through the coupling transformer 295 to the antenna 256. The secondary coil 296 of the coupling transformer is connected in series circuit from ground with capacitor 298.

The coupling networks 34, 60 and 94 shown in FIG. 1 are particularly adapted for modulator construction because they are made up of capacitors and resistors which do not require adjustments. Although each of the coupling networks 34, 60 and 94 is designed to pass a wide band of frequencies, it is contemplated that it may be desirable to substitute coupling networks similar in design to the networks 34, 60 and 94 but differing in capacitor and resistor values. Substitute networks for networks 34, 60 and 94 may thus be produced in modular forms differing only in the values of the capacitors and resistors of which they are made up. The modular networks will each have three plug or socket terminals each adapted to engage mating terminals in the transmitter corresponding to the coupling network input terminal, coupling network, output terminal, and a ground terminal.

The invention has been described in detail for the purpose of illustration but it will be obvious that numerous modifications and variations may be resorted to without departing from the spirit of the invention as defined in the accompanying claims.

I claim:

1. A system for radio signal transmission comprising: a central station having means for generating the carrier waves for the assigned frequencies of plural remote radio stations, said central station also having a broad band transmitting means for amplifying and transmitting said plural carrier waves, remotely located radio stations having means for receiving carrier waves transmitted from said central station, each station being assigned a specific carrier frequency on which it operates which is separated in frequency from the carrier frequency assigned to other remote stations receiving carrier waves from said central station, each remote station further having a selective carrier wave signal discriminating means for passing only the carrier wave frequency assigned to the remote station, a radio program originating means for producing modulation signals, a modulator for modulating a selected carrier wave with modulation signals, and transmitting means for transmitting the modulated carrier waves to remote radio receiving sets, said means for generating the carrier waves for the assigned frequencies of plural remote stations comprising plural signal generators each operating on a separate one of the assigned frequencies, and switching means for selectively connecting each signal generator to said broad band transmitting means, and said selective carrier wave signal discriminating means for passing only the carrier wave frequency assigned to the remote station including a selective frequency filter in series circuit with an amplifier having signal input and output terminals, and a degenerative feed back circuit connected from the signal output terminal of said amplifier to the signal input terminal of said amplifier, said feed back circuit feeding back signals of other than the carrier wave frequency assigned to the remote station from the output of said amplifier in phase opposition to signals coming into said input terminal from said selective frequency filter.

2. The system set forth in claim 1 wherein said degenerative feed back circuit is a parallel T null rejection filter.

3. The system set forth in claim 1 wherein said modulator includes a modulation transformer connected in series circuit with the output terminal of said amplifier.

4. A system for radio signal transmission comprising: a central station having means for generating the carrier waves for the assigned frequencies of plural remote radio stations, said central station also having a broad band transmitting means for amplifying and transmitting said plural carrier waves, remotely located radio stations having means for receiving carrier waves transmitted from said central station, each station being assigned a specific carrier frequency on which it operates which is separated in frequency from the carrier frequency assigned to other remote stations receiving carrier waves from said central station, each remote station further having a selective carrier wave signal discriminating means for passing only the carrier wave frequency assigned to the remote station, a radio program originating means for producing modulation signals, a modulator for modulating a selected carrier wave with modulation signals, and transmitting means for transmitting the modulated carrier waves to remote radio receiving sets, said means for generating the carrier waves for the assigned frequencies of plural remote stations comprising plural signal generators each operating on a separate one of the assigned frequencies, and switching means for selectively connecting each signal generator to said broad band transmitting means, and said broad band transmitter comprising at least two amplifier stages, one of said amplifiers being a first amplifier including an output terminal and the other of said amplifiers being a second amplifier including an input terminal, said output terminal of said first amplifier being connected to said input terminal of said second amplifier through a broad band RC coupling network having resistor and capacitor elements which are of such resistance and capacitance value as to shift the phase of the signal passing therethrough whereby the signal appearing at the input terminal of the second amplifier leads the signal appearing at the output terminal of the first amplifier by a phase angle of 180 degrees at the lowest frequency for which the transmitter is designed and said phase angle does not deviate substantially from 180 degrees over the range of frequencies for which the transmitter is designed.

5. The system set forth in claim 4 wherein said RC coupling network comprises three equal value capacitors connected in series between said output terminal and said input terminal and three substantially equal value resistors connected from the junctions of the first and second of said capacitors, and of the second and third of said capacitors and of the third capacitor and the input terminal of said second amplifier respectively to ground.

References Cited by the Examiner

UNITED STATES PATENTS

| | | | |
|---|---|---|---|
| 1,485,111 | 2/1924 | Bethenod | 325—158 |
| 1,700,625 | 1/1929 | Burket | 325—355 |
| 1,836,129 | 12/1931 | Potter | 325—180 |
| 1,904,544 | 4/1933 | Schmied | 343—208 |
| 2,094,113 | 9/1937 | Affel | 325—158 |
| 2,219,729 | 10/1940 | Tahon | 330—124 |
| 2,247,234 | 6/1941 | Hansell | 325—181 |
| 2,284,247 | 5/1942 | Bagnall | 343—208 |
| 2,451,021 | 10/1948 | Detuno | 330—128 |
| 2,622,192 | 12/1952 | Tarpley | 330—176 |
| 2,989,623 | 6/1961 | Byrne | 325—355 |

DAVID G. REDINBAUGH, *Primary Examiner.*